United States Patent [19]
Hill

[11] Patent Number: 5,574,975
[45] Date of Patent: Nov. 12, 1996

[54] PAGING METHOD USING POWER SHIFTED TRANSMITTERS

[75] Inventor: Thomas C. Hill, Wellington, Fla.

[73] Assignee: Motorola, Inc., Schaumburg, Ill.

[21] Appl. No.: 523,164

[22] Filed: Sep. 5, 1995

[51] Int. Cl.$^6$ ..................................................... H04B 7/26
[52] U.S. Cl. ....................... 455/51.2; 455/51.1; 455/38.3; 455/33.1
[58] Field of Search ................................. 455/33.1, 33.4, 455/51.1, 51.2, 67.1, 69, 38.3; 375/356

[56] References Cited

U.S. PATENT DOCUMENTS 5,457,808  10/1995  Osawa et al. ............................ 455/51.2
5,533,094   7/1996  Sanmugam ............................... 455/33.1

Primary Examiner—Andrew Faile
Assistant Examiner—Tuyen Q. Vu
Attorney, Agent, or Firm—John H. Moore

[57] ABSTRACT

Transmitters (18) in a two-way radio communication system (10) transmit location inquiries to subscribing pagers (14), each transmission occurring at a given power output level. Each pager (14) is capable of responding with an acknowledgment signal identifying a particular transmitter whose signal was captured. Messages are sent to those pagers which respond with proper acknowledgments. To locate a pager which failed to acknowledge receipt of a signal from a particular transmitter, the power output level of at least one transmitter, and preferably a group of transmitters, is changed, and the transmitters re-transmit the location inquiry at the changed power output levels. A similar power-shifting technique is provided for transmitters in a one-way communication system.

14 Claims, 5 Drawing Sheets

PAGING METHOD USING POWER SHIFTED TRANSMITTERS

FIELD OF THE INVENTION

This invention is generally directed to the field of radio communications, and more particularly to radio paging systems that employ simulcast transmissions.

BACKGROUND OF THE INVENTION

Radio paging systems can be one-way systems or two-way systems. In either paging system, a given service area will usually include a number of fixed site transmitters for sending information to a larger number of portable selective call receivers, such as pagers.

The one-way paging system typically operates in a simulcast mode in which a group of transmitters simultaneously transmit the same FM (frequency-modulated) information to selected pagers within the service area. Thus, a pager within the service area will typically be exposed to signals from more than one transmitter. If one such signal is sufficiently stronger than the others, the strongest signal will be "captured", the other signals will be rejected, and the pager will decode the information contained in the "captured" signal. If a pager in a one-way paging system is in a region where it receives two or more signals of nearly equal strength, it is likely that no "captured" will occur. However, if all transmitted signals contain the same information, the information contained in one received signal does not necessarily corrupt the information contained in another received signal. Consequently, the pager can usually decode the received information, except in a situation where there is a large phase delay between received signals. If such a phase delay exists, and the pager did not "captured" one of the transmitted signals, then the pager may not be able to decode the information that was sent to it.

A similar problem can arise in a two-way paging system in which a number of fixed-site transmitters simulcast frequency-modulated information to a number of pagers within the service area. The transmitted information includes an identification code (sometimes referred to as a color code or transmitter ID) that is unique to the transmitter (or unique to the transmitter site). If a pager "captured" one of the transmitted signals, it will decode the transmitter's identification code and send an acknowledgment signal back to fixed-site receivers. This acknowledgment signal will normally include the transmitter identification code which was decoded by the acknowledging pager. This allows the system to infer that the acknowledging pager is nearest to the transmitter whose identification code was decoded by that pager. That nearest transmitter can then be used to send, to that acknowledging pager, further information (such as messages) that are intended for its user.

On the other hand, if the pager cannot "capture" one of the signals and reject the other signals (because two or more received signals are nearly of equal strength), the pager will be presented with two or more signals that contain different transmitter identification codes. In this situation, the different received identification codes can corrupt each other, resulting in the pager being unable to properly decode any one of the transmitter identification codes. When this happens, the pager's acknowledgment signal will not include a proper transmitter identification code, in which case the system will not be able to determine which transmitter is closest to the pager. Merely re-sending the same information in the same way could give the same undesirable results. This problem could be avoided if all pagers in the system could reliably "capture" the signals that they are intended to receive.

DESCRIPTION OF THE PREFERRED EMBODIMENT

Figure 1:
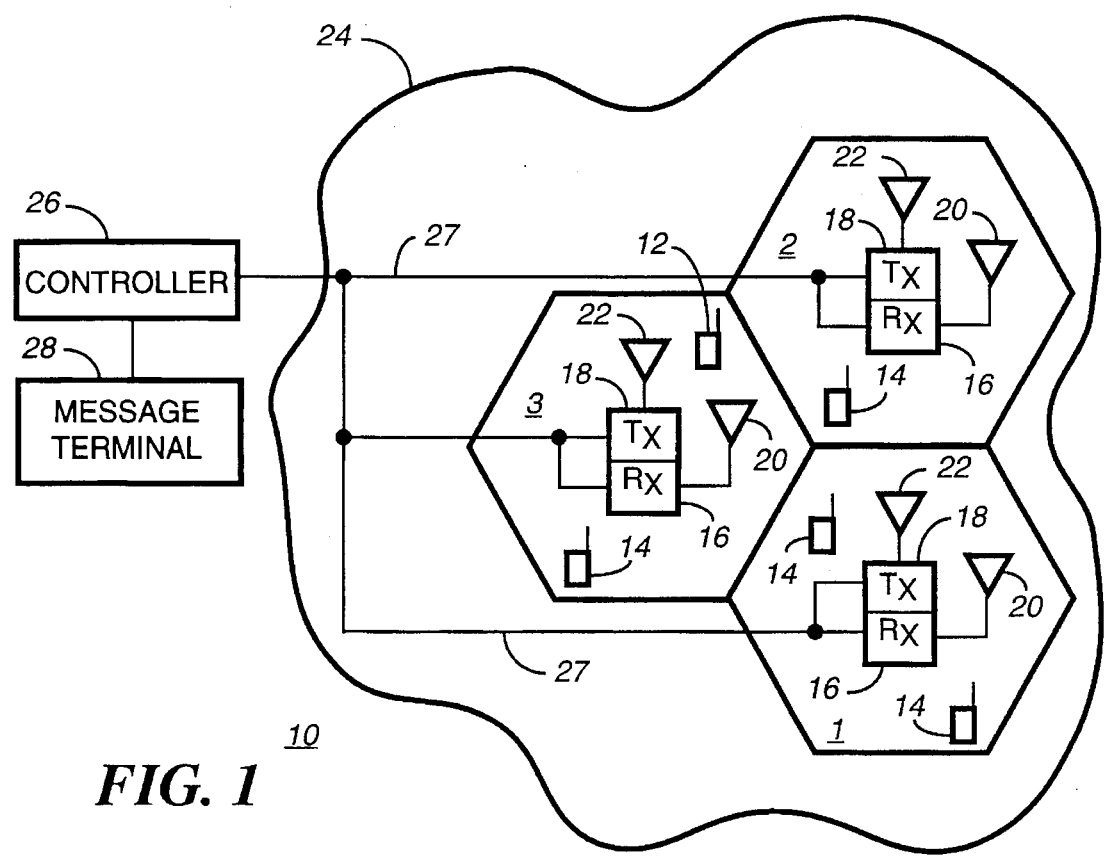
FIG.1 is a schematic representation of a two-way radio communication system operating in accordance with the invention.

Referring to FIG. 1, there is shown a radio paging system 10 that operates in accordance with the invention. The illustrated system provides communication with a plurality of portable pagers 12, 14 that subscribe to paging service. In this system, the pagers 12, 14 are two-way pagers capable of sending information as well as receiving information. Such two-way pagers are sold by Motorola, Inc. of Schaumburg, Ill. under the trademark "Tenor".

Also included in the system are conventional fixed site receivers (Rx) 16 and conventional transmitters (Tx) 18. Each receiver 16 has an antenna 20 for receiving transmissions from one or more portable pagers, and each transmitter 18 has an antenna 22 for transmitting radio signals to the pagers.

As shown, the communication system is located with a service area 24 which is preferably divided into hexagonal cells, with one transmitter and at least one receiver located in each cell. The illustrated service area 24 is shown with a single three-cell cluster having a first cell 1, a second cell 2, and a third cell 3. It will be understood that additional three-cell clusters may be included to completely cover the service area 24.

The operation of the receiver 16 and transmitter 18 is coordinated by a controller 26 via communication links 27 that may be twisted pair telephone wires, RF links, or other suitable communication links.

Coupled to the controller 26 is a conventional message terminal 28 that receives and queues messages received, for example, from a public telephone system (not shown). The controller 26 encodes outbound messages (to the pagers) and decodes inbound messages (from the pagers), and schedules the transmission of messages using conventional techniques.

The architecture and operation of such a controller is described, for example, in U.S. application Ser. No. 08/404, 698, filed Mar. 15, 1995 and assigned to the assignee of this invention, the teachings of which application are incorporated herein. Certain modifications to the controller's operation that enable the illustrated communication system to function according to the invention are described below.

In conventional operation, the transmitters 18 simulcast (transmit substantially simultaneously) certain information to the pagers 12, 14. For example, all the transmitters 18 may transmit, by FM simulcast, certain synchronization information and location inquiries to all pagers in the service area for which messages are waiting to be sent. The synchronization information sent by all the transmitters 18 is identical, but the location inquiries contain information that is unique to each transmitter. Each location inquiry includes a code ( usually called a pager ID or pager address) that identifies the pager being addressed, plus a "color code" or transmitter ID that uniquely identifies the transmitter. Thus, the color code portion of each location inquiry will differ from transmitter to transmitter.

Such synchronization information and location inquiries may be directed, for example, to the pager 12 which is located near the boundary between cells 2 and 3. Under ideal circumstances, the signal received by the pager 12 from the transmitter in cell 3 may be sufficiently stronger than the signals received from transmitters in cells 1 and 2 that the pager 12 "captures" the signal received from the transmitter in cell 3. The pager 12 will decode the transmitter ID and then respond with an acknowledgment signal that includes the decoded transmitter ID, thus identifying the transmitter in cell 3 as likely being the closest transmitter. Thereafter, the system selects the transmitter in cell 3 to send a voice or data message to the pager 12.

In some circumstances, the pager 12 may be in an area of substantially equal power, meaning that it is receiving signals of substantially equal strength from at least two transmitters. In that situation, the pager 12 may not "capture" any one transmitted signal, but it will likely be capable of decoding the synchronization information that is identically transmitted by all the transmitters 18. However, because the transmitters 18 each send a different transmitter ID and because the pager 12 has not captured a transmission from any one transmitter 18, the different transmitter ID sent as part of the location inquiry from one transmitter can corrupt the transmitter ID sent by another transmitter. Consequently, the pager 12 may incorrectly decode a received transmitter ID and acknowledge with an invalid transmitter ID. When that occurs, a conventional communication system cannot reliably locate the acknowledging pager. That is, the system cannot reliably determine which transmitter 18 is closest to the pager.

To overcome this problem, the controller 26 is modified to cause the transmitters 18 to initially transmit, at some given power output levels, the information, including location inquiries, to those pagers in the service area that are to receive messages queued by the message terminal 28. In this initial transmission, the power output levels of all the transmitters 16 may be equal to each other, or set at some other predetermined levels. Thereafter, the power output level of at least one of the transmitters 18 is changed (increased or decreased), and each transmitter 18 re-transmits at least part of the information, including the location inquiry, to at least some of the pagers 12, 14. With this technique, any addressed pager that was in an equal power area during the initial transmission, and hence unable to capture a single transmission, would likely be in an unequal power area during the second transmission and would capture the strongest received signal.

In a three cell cluster as shown in FIG. 1, it is preferred to increase the power output level of at least one transmitter, decrease the power output level of at least one other transmitter, and to hold constant the power output level of a third transmitter.

Figure 2:
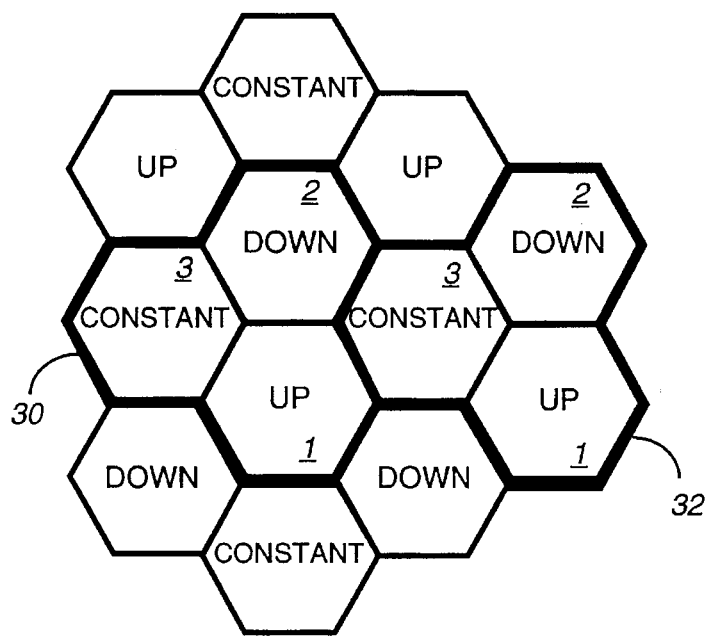
FIG.2 shows the arrangement of cells that may be used with the system of FIG. 1, and how power output levels are shifted for various transmitters within those cells in accordance with the invention.

This technique can also be applied to multiple clusters of cells. Referring to FIG.2, a first cluster 30 includes a first cell 1, a second cell 2 and a third cell 3, identical to the arrangement of cells shown in FIG.1. A similar cluster 32 also contains first, second and third cells.

Each cell in the clusters 30, 32 contains a fixed site receiver and a transmitter (not shown). During the initial transmission of information, the power output level of each transmitter in clusters 30 and 32 is at a given level. Typically, the transmitters will have equal power output levels for the first transmission. For the second transmission, the power output levels of some of the transmitters are shifted as indicated in FIG. 2. Specifically, the power output level of each transmitter in a first cell is increased, the power output of each transmitter in a second cell is decreased, and the power output level of each transmitter in a third cell is held constant (unchanged from its initial power output level). With this power shifting technique, any pager that experienced an equal power situation during the first transmission is most likely to experience an unequal power situation during the second transmission. Thus, any pager that was unable to capture a transmitted signal during the first transmission would likely capture a transmitted signal during the second transmission, and thereby be able to properly decode a transmitter ID that is part of the location inquiry sent during both transmissions.

The way in which the invention is preferably used in a two-way voice paging system may be more fully understood by first considering an existing signaling protocol that is advantageously used by the transmitters 18 when operating in accordance with the invention.

Figure 3:
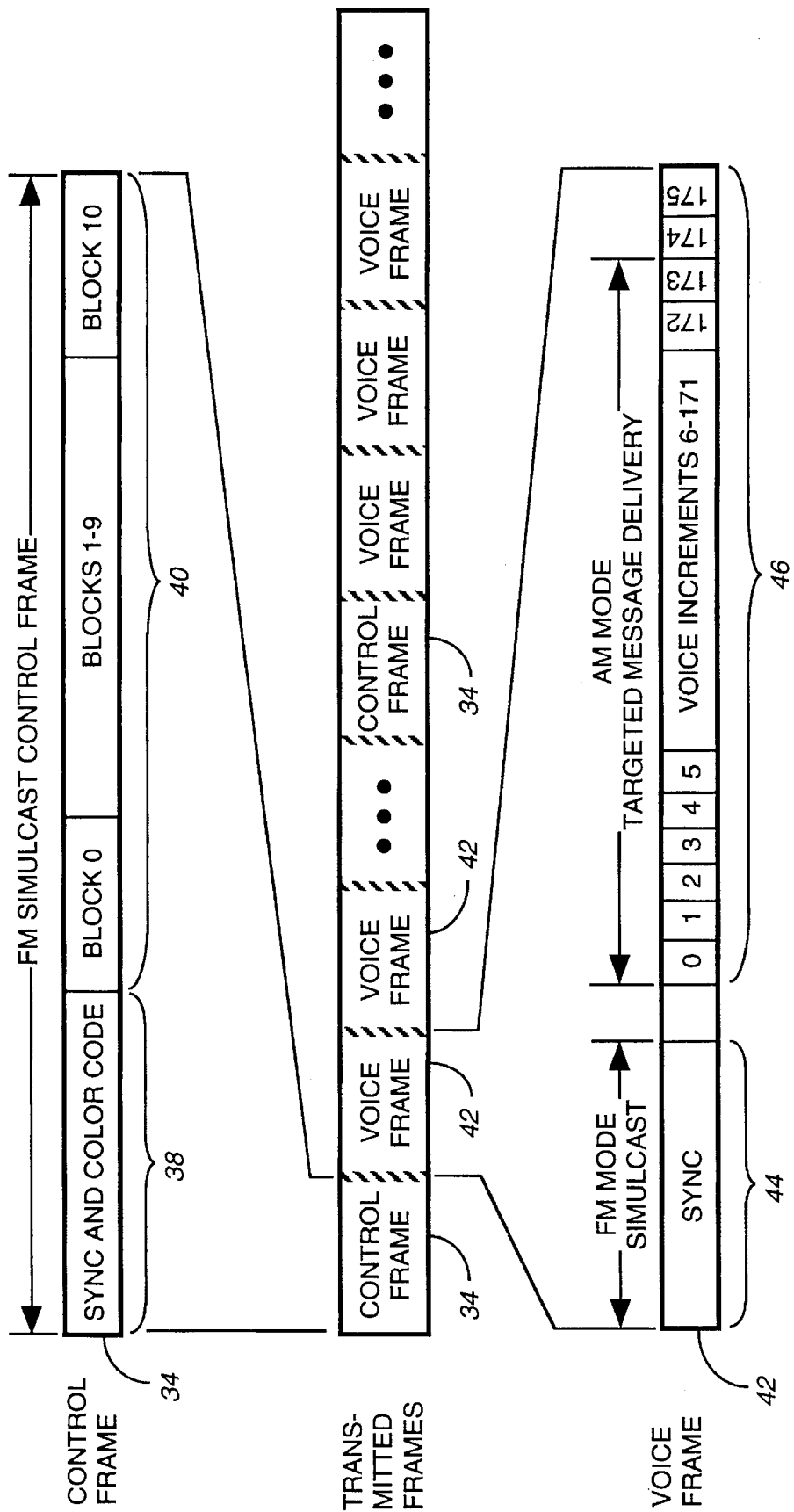
FIG.3 schematically shows the protocol that may be used by the transmitters of FIG. 1 in sending information to pagers in the system.

As shown in FIG.3, two types of frames are time multiplexed on the channel used by the transmitters 18, control frames 34, and voice (message) frames 42. Control frames are used to address subscribing pagers and to deliver data messages. Voice frames are used only for delivery of voice messages. A control frame 34 is sent first, including a pager address and message instructions, telling the addressed pagers which subsequent voice frames to look at for receipt of their voice messages. A number of voice frames 42 are sent next. Then another control frame is sent, specifying addresses of additional pagers to which messages will be sent by use of additional voice frames. The length of both types of frames is 1.875 seconds. A complete cycle of 128 frames takes four minutes. More details of this protocol and the way it may be executed are described in U.S. application Ser. No. 08/439,839 in the name of Siwiak, filed May 12, 1995 and assigned to the assignee of this invention.

The control frames 34 include a synchronization field 38 and an information field 40. The synchronization field includes the "color code" referred to previously which is essentially a code that acts as a unique ID for a transmitter. An acknowledging pager returns the color code (transmitter ID) as part of its acknowledgment signal to help the system select a transmitter for subsequent delivery of a voice message to that pager.

The information field 40 of a control frame includes 11 blocks (Block 0 through Block 10) that convey system information to all subscribing pagers, to address a particular subscribing pager, and instructions to the pager for receipt of subsequent data or voice messages. This information field may be simulcast at 6400 BPS using four level FSK modulation.

The voice frames 42 begin with a synchronization field 44 which is simulcast on the control channel frequency at 1600 BPS. The synchronization field 44 is followed by voice message elements 46 which are preferably broadcast as AM SSB (single side band) transmission. It should be noted that transmission of the voice message elements 46 is done by "targeted" message delivery, meaning that the transmitter whose ID was decoded and acknowledged by an addressed pager (presumably, the closest transmitter to that pager) sends the voice message to that pager. The voice message is not simulcast.

Figure 4:
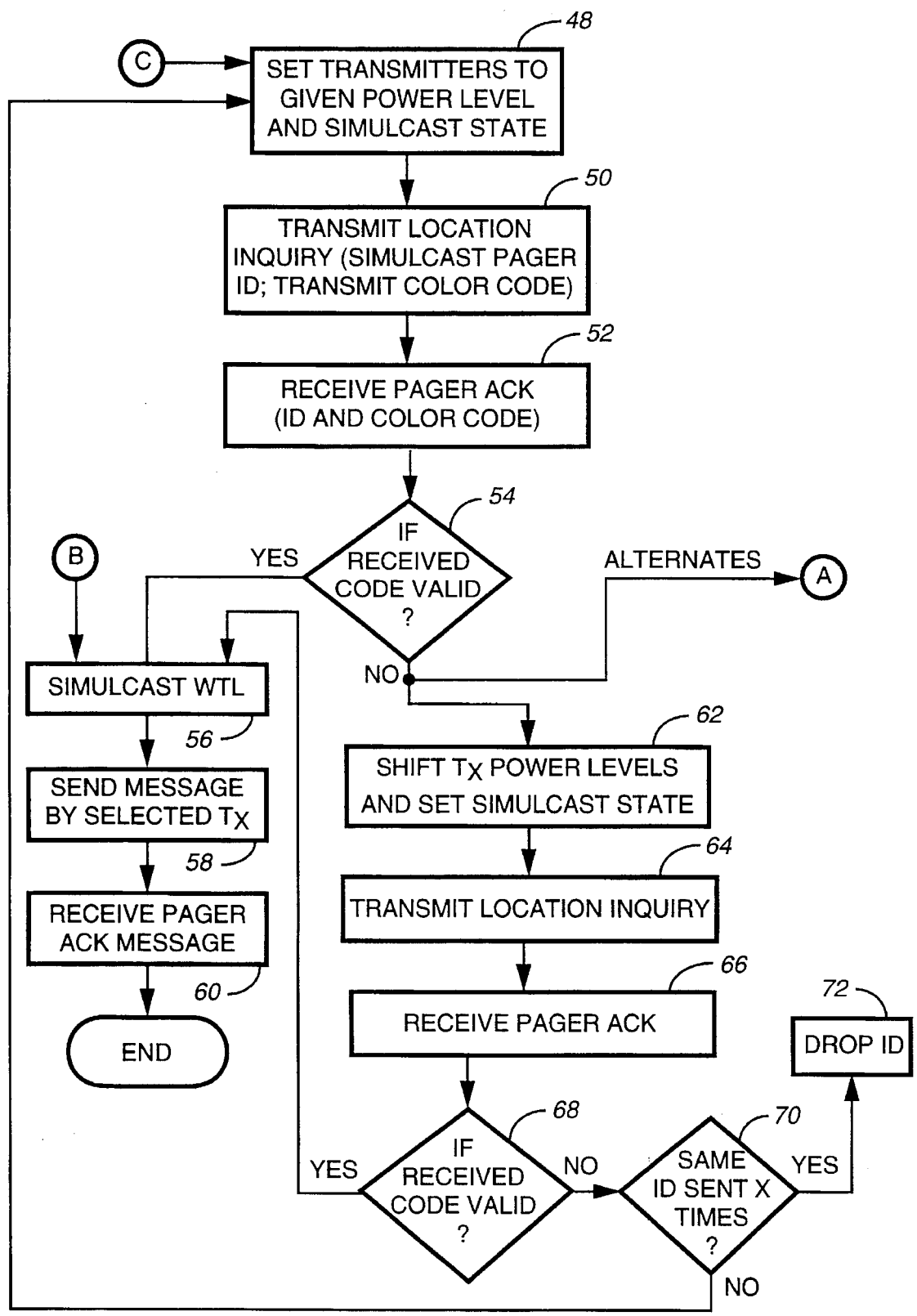
FIG.4 is a flow chart indicating how the controller shown in FIG. 1 may be programmed to control the transmitters in the system according to the invention.

Control over the transmission of the protocol shown in FIG.3, and other aspects of system performance, is exercised by the controller 26. This controller includes a computer that is programmed to exercise that control and to control the power shifting of the transmitters in accordance with the invention. The flow chart of FIG. 4 shows the preferred steps programmed into the controller 26 for power shifting the transmitters in the system of FIG. 1.

The program begins with step 48 which sets the transmitters 18 to a given, possibly equal, power level and puts them in a simulcast state. The next instruction 50 causes the transmitters 18 to transmit a location inquiry which is sent as part of a control frame 34 (FIG.3). The location inquiry includes at least one pager address that is simulcast as part of the information block 40, and the color code (transmitter ID) which is in the synchronization field 38, and which is unique to each transmitter.

Assuming that an addressed pager received and captured the first transmission sent per step 50, it would acknowledge by sending an acknowledgment signal which includes its own pager address plus the color code it decoded. See step 52. That acknowledgment signal is received by the fixed site receivers 16 (FIG. 1).

The controller 26 compares the color code (transmitter ID) sent back as part of the acknowledgment signal to a list of valid transmitter codes (step 54). If a match is found, the next step 56 causes the transmitters 18 to simulcast a WTL (Where to Listen) signal as part of a subsequent control frame. The WTL signal identifies the channel and time when the addressed pager's message will be sent. If the location inquiry sent per instruction 50 was sent as part of the control frame 34, the WTL signal sent per step 56 would normally be sent as part of the next control frame. Voice frames 42 between control frames 34 contain voice messages for pagers that were previously sent location inquiries and WTL signals.

The next step 58 causes a selected transmitter or transmitters (preferably the one transmitter identified by the pager's acknowledgment signal) to transmit a message to this pager as part of one or more voice frames. Upon receipt of the message, the pager transmits an acknowledgment signal per step 60 which is received by the fixed site receivers 16.

If a match was not found per step 54, perhaps because the acknowledging pager did not capture a transmission, and consequently decoded a corrupted color code, the next step 62 causes the transmitters 18 to have shifted power levels (as shown in FIG.2) and to go to a simulcast state. Then transmitters 18 simulcast another location inquiry per step 64. This location inquiry is directed only to pagers that did not properly respond to the previously sent location inquiry (per step 50) and to pagers that are newly queued.

The addressed pagers will respond with an acknowledgment signal (step 66) and the controller will again determine whether the acknowledgment signal contains a valid color code (step 68). If a valid color code is detected, steps 56–60 are executed to send a message to the acknowledging pager. Otherwise, the controller determines whether the same pager ID (address) has been sent X times (step 70) where X is the upper limit on the number of times the system will try to locate a pager. If that limit has been reached, then step 72 causes that pager ID to be dropped from the list of queued messages. If the limit X has not been reached, the program returns to step 48 to send another location inquiry to that pager.

Stated more generally, the steps illustrated in FIG.4 include causing each of the transmitters to transmit, at given power output levels, certain information, including a location inquiry, to selected pagers which are capable of sending acknowledgment signals to the fixed site receivers. Each such acknowledgment signal includes an indication of whether an acknowledging pager properly detected a location inquiry. An indication of proper detection is the inclusion of a valid transmitter ID (color code). Then, one or more selected or targeted transmitters transmit a message to the pager. If the pager's acknowledgment signal did not include a valid transmitter ID, the power output levels of selected transmitters are changed, and the location inquiry is re-transmitted (preferably by simulcast) at the changed power output levels. During this second transmission, additional subscribing pagers which were newly queued may be addressed in addition to the pagers that are being addressed for the second time.

According to another aspect of the invention, the second transmission of a location inquiry is made by changing the power output level of one or more transmitters associated with a receiver or receivers that receive the strongest acknowledgment signal in response to the initial transmission of a location inquiry. This will now be explained more fully with reference to FIG. 5.

Figure 5:
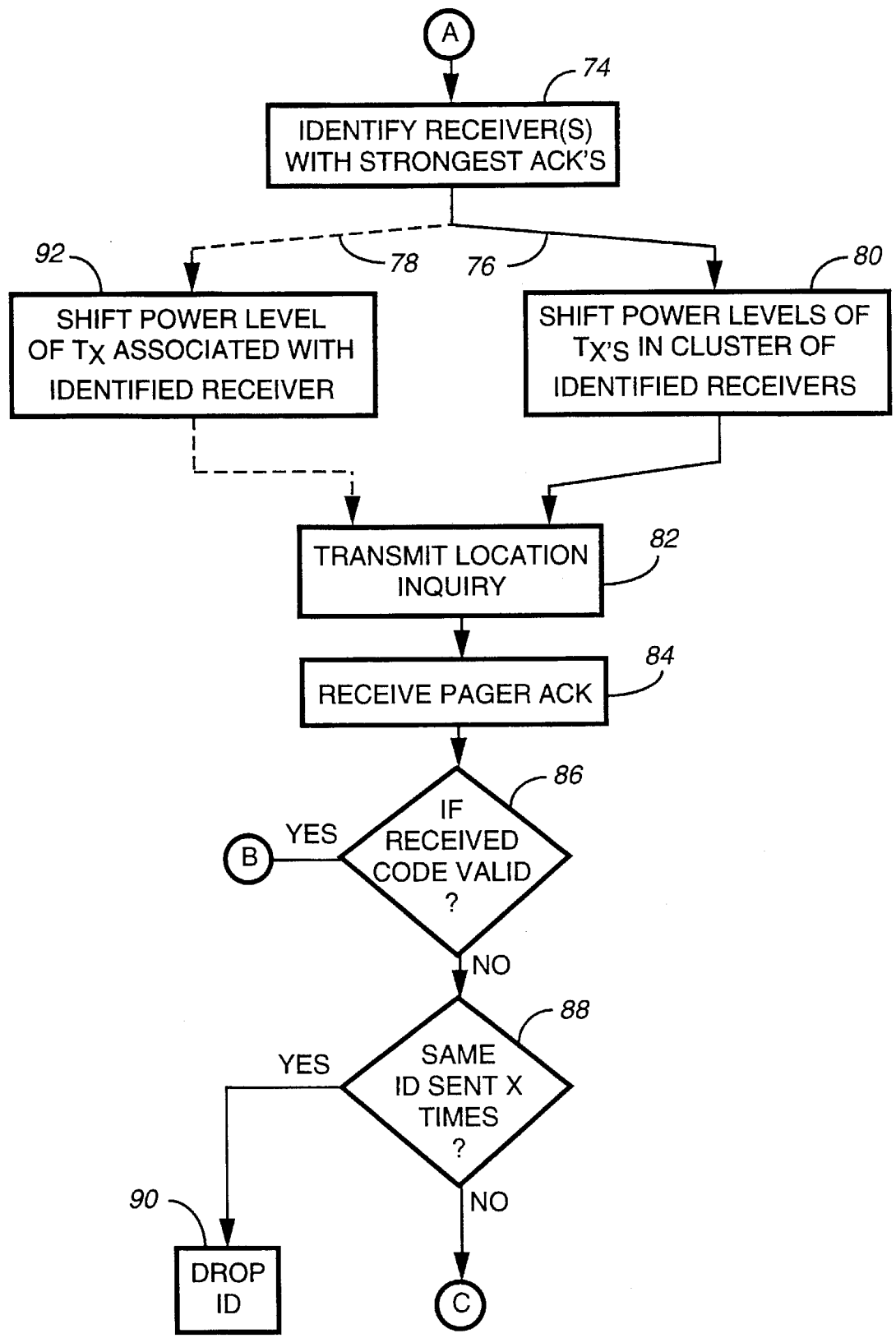
FIG.5 is a flow chart showing an alternative way of programming the controller of FIG. 1.

According to the technique illustrated in FIG.5, a first transmission is sent to selected pagers per steps 48 and 50 of FIG.4, and an acknowledgment signal is analyzed for a correct response per steps 52 and 54. If an invalid code is sensed, the program proceeds via "alternate" and node A to instruction 74 of FIG.5.

According to instruction 74, the system determines which receiver 16 (FIG. 1) received the acknowledgment signal with the strongest signal strength. It will be appreciated that, because the receivers 16 are located at different distances from an addressed pager, the acknowledgment signals reaching them will arrive at various signal strengths. According to this aspect of the invention, the receiver or receivers that received the strongest acknowledgment signal are identified using conventional techniques, and that information is used to select one or more transmitters whose power output levels will be shifted for a second transmission.

Following step 74, the process may proceed along one of two alternate paths, 76 or 78, depending on whether the system operator desires to shift output power levels of groups of transmitters, or shift merely the power output level of a single transmitter. If the former is desired, path 76 is selected. The next step 80 shifts the power levels of at least some of the transmitters that are in the same clusters as the receiver or receivers identified in step 74. For example, if receiver 16 in cell 3 (FIG. 1) is identified as having received the strongest acknowledgment signal, and the receiver in another cluster received the next strongest signal, then the power levels of at least some of the transmitters in the same clusters are shifted, preferably as shown in FIG.2. Assuming the two identified receivers were in clusters 30 and 32 of FIG. 2, then the transmitters in cells 1 of clusters 30 and 32 would have their power output levels increased. The power output levels of the transmitters in cells 2 of clusters 30 and 32 would be reduced, and the power output levels of the transmitters in cells three would remain constant.

Alternately, the system may identify the one receiver that receives the strongest acknowledgment signal, and shift the power output levels of the transmitters in the same cluster as the one identified receiver.

Returning to FIG. 5, the next step 82 causes the location inquiry to be re-transmitted by at least all transmitters in the cluster of the previously identified receiver(s) using the shifted power levels. Preferably, other transmitters in the system transmit at unchanged power levels.

In the next step 84, the addressed pager's acknowledgment signal is received, and step 86 questions whether the received color code (transmitter ID) is valid. If it is valid, the program proceeds via node B to steps 56–60 (FIG. 4) for simulcasting the WTL (where to listen) signal and for then transmitting a message by the transmitter identified by the acknowledged color code.

If step 86 found the code to be invalid, the program proceeds to step 88 to determine whether the same pager ID has been sent X times. If the answer is yes, that ID is dropped at instruction 90. If the answer is no, the program proceeds via node C to step 48 (FIG. 4) to go through steps 48 through 86 again.

Returning now to step 74 (FIG. 5), if the system operator desires to shift the output power level of but a single transmitter after executing step 74, then the program proceeds via path 78 to step 92. In the latter step, the power level of a single selected transmitter is shifted (up or down), the selected transmitter being the one in the same cell as the receiver identified in step 74. Thereafter, the program proceeds to instructions 82 etc. for re-transmitting a further location inquiry using at least the transmitter whose power output level was shifted per step 92. Preferably, the system operates in simulcast wherein all transmitters re-transmit the location inquiry, with only the selected transmitter having a shifted power level.

Figure 6:
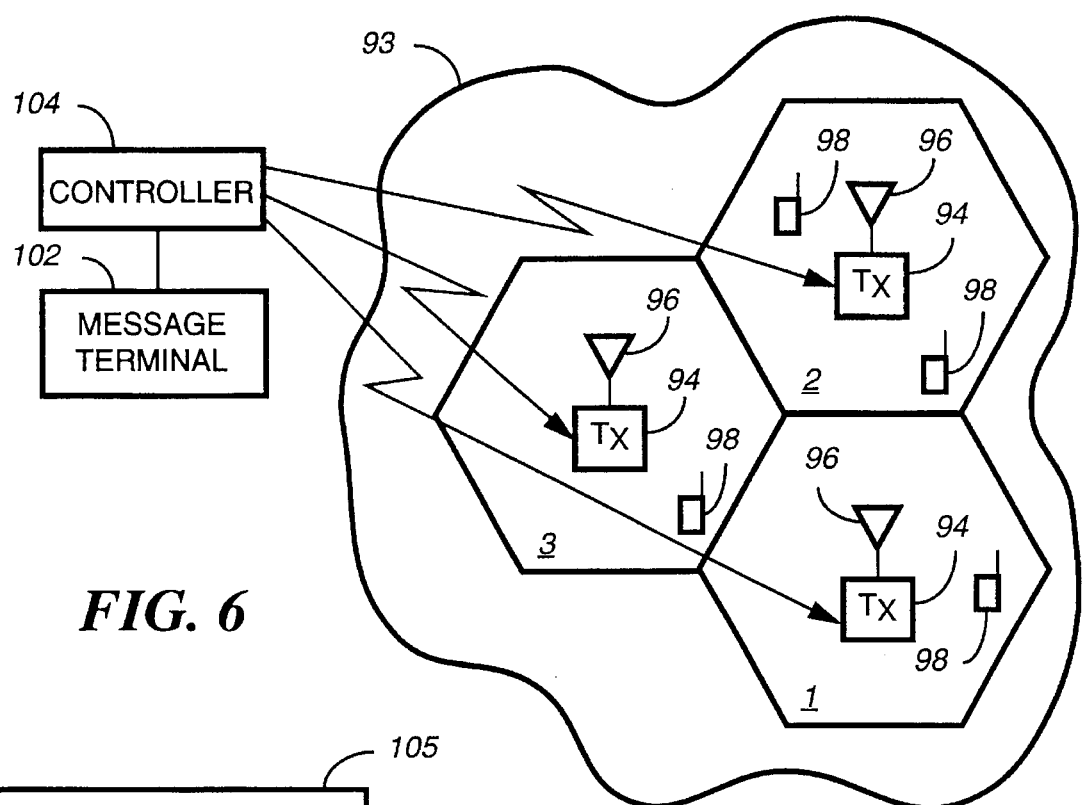
FIG.6 is a schematic representation of a one-way radio communication system operating in accordance with the invention.

The foregoing discussion has been previously directed to communicating with two-way pagers capable of sending acknowledgment signals. The invention, however, is also useful in communication systems for receive-only pagers. FIG. 6 illustrates such a system.

As shown, a service area 93 includes a three-cell cluster having cells 1, 2 and 3. A transmitter 94 with an antenna 96 is located in each cell for transmitting information to receive-only pagers 98. A message terminal 102 and a controller 104 operate similarly to the message terminal 28 and controller 26, except that the former are programmed to operate with and control a one-way communication system.

Figure 7:
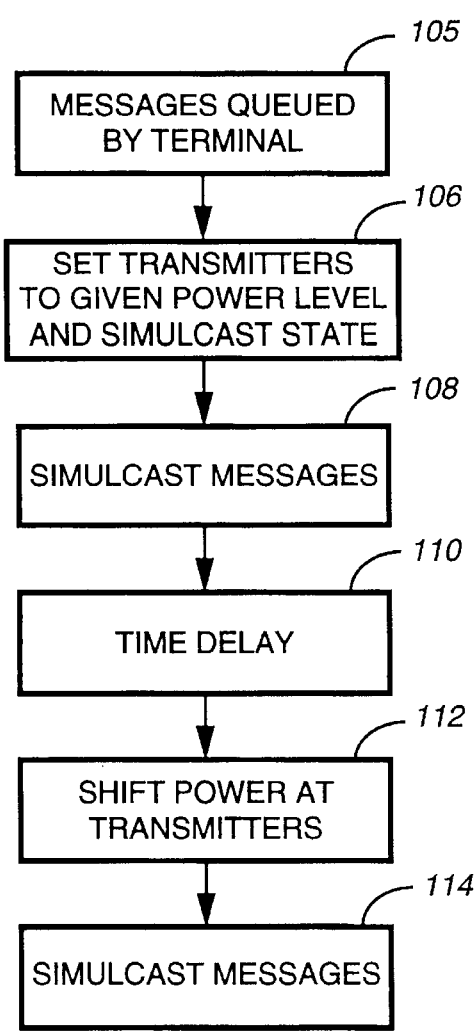
FIG.7 is a flow chart showing how the controller of FIG.6 may be programmed to control the transmitters shown in FIG.6 according to the invention.

Generally, the system shown in FIG. 6 operates in accordance with the process illustrated in FIG. 7. The process starts with step 105 which causes the message terminal 102 to queue messages to be transmitted. The next step 106 sets each transmitter 94 to a given power level and to a simulcast state. Then the queued messages (including addresses for each pager) are simulcast (step 108) by the transmitters 94.

After a time delay (step 110), step 112 causes the power output levels of the transmitters 94 to be shifted, preferably as shown in FIG. 2. That is, the transmitter 94 in cell 1 is given an increased power output level, the transmitter in cell 2 is given a reduced power level, and the transmitter in cell 3 has its power output level unchanged. After changing the transmitter's power output levels, the messages sent per instruction 108 are again simulcast per instruction 114.

If the service area 93 includes more than one cluster of cells, then the power output level of at least one transmitter in each cluster is changed for the second transmission. Preferably, the power output levels of transmitters in the different clusters are shifted as shown in FIG. 2 such that the power output level of each transmitter in a first cell is increased, the power output level of each transmitter in a second cell is decreased, and the power output level of each transmitter in a third cell is held constant.

In view of the forgoing, it will be appreciated that the invention is applicable to various kinds of communication systems. Strictly cellular arrangements of transmitters are not necessarily required, so long as there is a sufficient number of transmitters to adequately cover a service area. In any case, pagers and other types of selective call receivers operating with the inventive communications system will more reliably receive their intended messages.

Although the invention has been described in terms of preferred and alternate embodiments, it will be obvious to those skilled in the art that various modifications and alterations may be made without departing from the invention. For example, although the invention has been described in terms of transmitting information to pagers, other types of selective call receivers could be used. Accordingly, the term pager as used herein is intended to include all forms of selective call receivers.

I claim:

1. A method of transmitting information from a group of radio transmitters to portable pagers, comprising:

(a) causing each transmitter in the group of transmitters to transmit, at given power output levels, the information to the pagers; and thereafter (b) temporarily changing the power output levels of at least one transmitter within the group of transmitters and causing each transmitter in the group of transmitters to re-transmit at least part of the information to at least some of the portable pagers.

2. A method as set forth in claim 1 wherein step (b) includes increasing the power output level of at least one transmitter, and decreasing the power output level of at least one other transmitter.

3. A method as set forth in claim 2 wherein step (b) further includes holding constant the power output level of at least one transmitter.

4. A method as set forth in claim 1 wherein the information is transmitted within an area containing at least one cluster of cells, each cluster having a first cell, a second cell and a third cell with a transmitter in each cell, and wherein step (b) includes increasing the power output of each transmitter in a first cell, decreasing the power output of each transmitter in a second cell, and holding constant the power output of each transmitter in a third cell.

5. A method of transmitting information to pagers from a group of transmitters located in clusters of cells, comprising:

(a) establishing given power output levels for the transmitters, and using the transmitters to simulcast information to selected pagers; and (b) in each cluster of cells, changing the power output level of at least one transmitter, and again using the transmitters to simulcast the information sent in step (a).

6. A method as set forth in claim 5 wherein each cluster of cells includes a first cell, a second cell and a third cell, with a transmitter located in each cell, and wherein step (b) includes increasing the power output level of each transmitter in a first cell, decreasing the power output level of each transmitter in a second cell, and holding constant the power output level of each transmitter in a third cell.

7. A method as set forth in claim 1 wherein a fixed site receiver is associated with each transmitter, wherein the information transmitted in step (a) includes a location inquiry directed to selected pagers, wherein the selected pagers are capable of sending acknowledgment signals to the fixed site receivers in response to receipt of the information, wherein each acknowledgment signal includes an indication of whether an acknowledging pager properly detected a location inquiry, and further including, prior to step (b), using one or more selected transmitters to transmit messages to pagers which sent acknowledgment signals indicative of proper detection of a location inquiry.

8. A method as set forth in claim 7 wherein the fixed site receivers receive acknowledgment signals of various signal strengths, and, for each pager that sends an acknowledgment signal indicative of failure to properly detect a location inquiry, identifying the fixed site receiver that received the strongest such acknowledgment signal, and wherein step (b) includes temporarily changing the power output level of the transmitter associated with the identified fixed site receiver, and re-transmitting a further location inquiry at the changed power output level.

9. A method as set forth in claim 7 wherein the information is transmitted within an area containing clusters of cells, with a transmitter and a fixed site receiver in each cell, wherein the fixed site receivers receive acknowledgment signals of various signal strengths and, for each pager that sends an acknowledgment signal indicative of failure to properly detect a location inquiry, identifying one or more fixed site receivers that received the strongest such acknowledgment signals, and wherein step (b) includes temporarily changing the power output levels of at least some of the transmitters that are in the same clusters as the identified fixed site receiver(s), and using at least the transmitters in said same clusters to re-transmit a further location inquiry to pagers that failed to properly detect the location inquiry sent in step (a).

10. A method as set forth in claim 9 wherein each cluster has a first cell, a second cell and a third cell, and wherein the step of temporarily changing the power output levels includes, for each cluster in which there is an identified fixed site receiver, increasing the power output level of each transmitter in a first cell, decreasing the power output of each transmitter in a second cell, and holding constant the power output of each transmitter in a third cell.

11. A method as set forth in claim 7 wherein the information is transmitted in an area containing clusters of cells, with a transmitter in each cell, and wherein step (b) includes temporarily changing the power output levels of selected transmitters and re-transmitting, at the changed power output levels, a further location inquiry to each pager that failed to properly detect the location inquiry sent in step (a).

12. A method as set forth in claim 11 wherein each cluster has a first cell, a second cell and a third cell, and wherein the step of temporarily changing the power output levels includes increasing the power output level of each transmitter in a first cell, decreasing the power output level of each transmitter in a second cell, and holding constant the power output level of each transmitter in a third cell.

13. A method of communicating with pagers by use of transmitters and fixed site receivers located in clusters of cells, comprising:

(a) causing the transmitters to transmit, at given power output levels and to selected pagers, information including location inquiries, wherein the selected pagers are capable of responding to receipt of the information by sending to the fixed site receivers acknowledgment signals indicating whether an acknowledging pager properly detected a location inquiry;

(b) using one or more selected transmitters to transmit messages to pagers which sent acknowledgment signals indicative of proper detection of a location inquiry; and (c) increasing the power output level of each transmitter in a first cell of each cluster, decreasing the power output level of each transmitter in a second cell of each cluster, and holding constant the power output level of each transmitter in a third cell of each cluster, and re-transmitting a further location inquiry to pagers that failed to properly detect a location inquiry sent in step (a).

14. A method of communicating with pagers by use of transmitters and fixed site receivers located in three-cell clusters, with a transmitter and fixed site receiver in each cell, the method comprising:

(a) causing the transmitters to transmit, at given power output levels and to selected pagers, information including location inquiries, wherein the selected pagers are capable of responding to receipt of the information by transmitting acknowledgment signals indicating whether an acknowledging pager properly detected a location inquiry, acknowledgment signals of various signal strengths being received by the fixed site receivers;

(b) using one or more selected transmitters to transmit messages to pagers which sent acknowledgment signals indicative of proper detection of a location inquiry;

(c) identifying one or more fixed site receivers that received acknowledgment signals with the strongest signal strengths;

(d) for each cluster in which there is an identified fixed site receiver, increasing the power output level of each transmitter in a first cell of such cluster, decreasing the power output of each transmitter in a second cell of the same cluster, and holding constant the power output of each transmitter in a third cell of the same cluster; and (e) using at least the transmitters mentioned in step (d) to re-transmit a further location inquiry to pagers that failed to properly detect a location inquiry sent in step (a).

\* \* \* \* \*